(12) United States Patent
Khan et al.

(10) Patent No.: US 9,973,580 B2
(45) Date of Patent: May 15, 2018

(54) STATE-BASED INTERCEPT OF INTERACTIVE COMMUNICATIONS NETWORK CONNECTIONS FOR PROVISION OF TARGETED, STATUS-BASED MESSAGING

(71) Applicant: Hughes Network Systems, LLC, Germantown, MD (US)

(72) Inventors: Tayyab Khan, Boyds, MD (US); Krishna Samavedam, Rockville, MD (US); Venkat Ganesan, Germantown, MD (US); Ganeshan Ramachandran, Frederick, MD (US); Robert Torres, New Market, MD (US)

(73) Assignee: Hughes Network Systems, LLC, Germantown, MD (US)

(*) Notice: Subject to any disclaimer, the term of this patent is extended or adjusted under 35 U.S.C. 154(b) by 340 days.

(21) Appl. No.: 14/706,951

(22) Filed: May 7, 2015

(65) Prior Publication Data
US 2015/0326671 A1    Nov. 12, 2015

Related U.S. Application Data

(60) Provisional application No. 61/990,081, filed on May 7, 2014.

(51) Int. Cl.
*G06F 15/16* (2006.01)
*H04L 29/08* (2006.01)
*H04L 29/06* (2006.01)

(52) U.S. Cl.
CPC ............ *H04L 67/141* (2013.01); *H04L 67/42* (2013.01)

(58) Field of Classification Search
CPC ............................ H04L 67/141; H04L 67/42
See application file for complete search history.

(56) References Cited

U.S. PATENT DOCUMENTS 7,139,828 B2 * 11/2006 Alkhatib ........... H04L 29/12509
709/230
7,343,485 B1    3/2008 Huang et al.
(Continued)

OTHER PUBLICATIONS

PCT/US2015/029799 ISR & WO, dated Aug. 7, 2015.
EPO, "Supplementary European Search Report", EPO Application No. 15789707.5, dated Nov. 24, 2017.

*Primary Examiner* — Viet D Vu
(74) *Attorney, Agent, or Firm* — Potomac Technology Law, LLC

(57) ABSTRACT

An approach is provided for reliable provision of targeted, status-based messaging to a client terminal in a computer network, such as a wide area resource-based network. A terminal node receives a message originating from a client terminal, wherein the terminal node serves as an entry point to, and services communications connections over, a wide area network for the client terminal. The terminal node determines that the message comprises an initiation request for establishing a communications connection over the wide area network between the client terminal and a remote server, and that an intercept state is in effect. The terminal node establishes the communications connection as a local connection between the client terminal and the terminal node, and services the communications connection via a local server function, wherein the servicing of the communications connection via the local server function comprises a provision of status-based messaging to the client terminal.

18 Claims, 6 Drawing Sheets

(56) References Cited

U.S. PATENT DOCUMENTS

| | | | |
|---|---|---|---|
| 7,979,508 B1* | 7/2011 | Lamberton | H04L 29/08846 |
| | | | 709/201 |
| 9,154,955 B1* | 10/2015 | Bertz | H04W 12/08 |
| 2003/0185232 A1* | 10/2003 | Moore | G06Q 20/085 |
| | | | 370/465 |
| 2006/0064750 A1* | 3/2006 | Kersey | H04L 63/0428 |
| | | | 726/14 |
| 2006/0291481 A1 | 12/2006 | Kumar | |
| 2008/0034419 A1 | 2/2008 | Mullick et al. | |
| 2011/0191467 A1 | 8/2011 | Imbimbo et al. | |
| 2013/0073743 A1 | 3/2013 | Ramaswamy et al. | |
| 2013/0204988 A1* | 8/2013 | Grewal | H04L 67/28 |
| | | | 709/221 |
| 2014/0025819 A1 | 1/2014 | Lorang et al. | |
| 2015/0052585 A1* | 2/2015 | Matthews | H04L 63/0823 |
| | | | 726/4 |

* cited by examiner

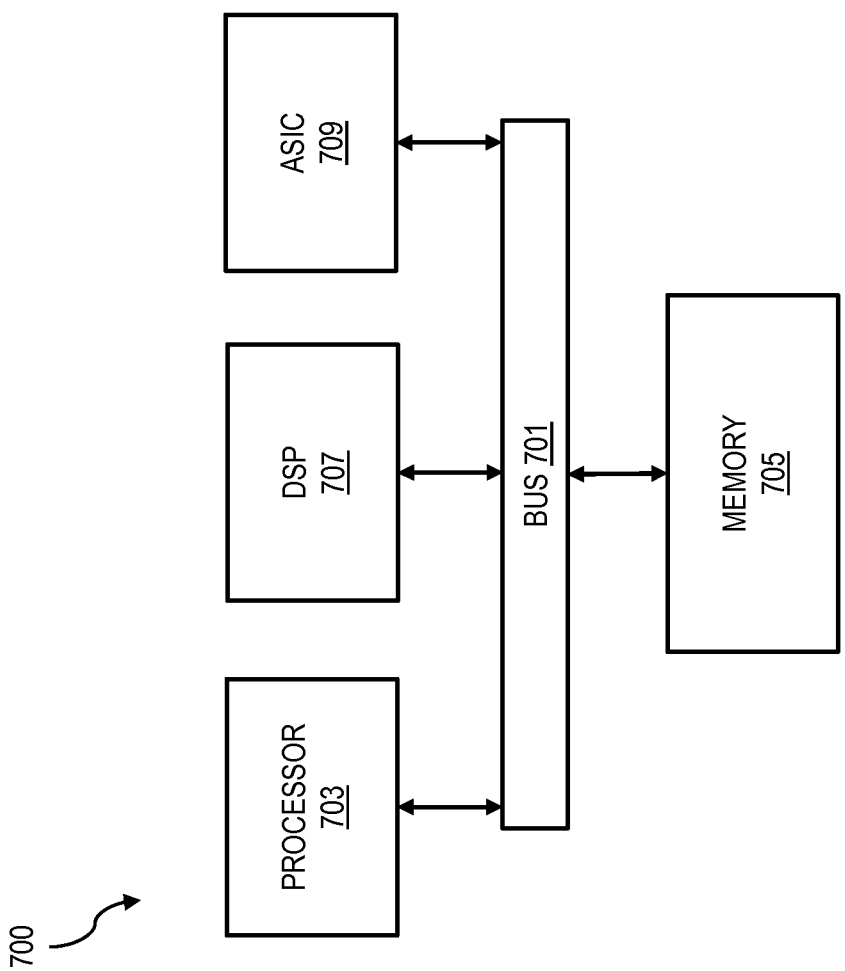

STATE-BASED INTERCEPT OF INTERACTIVE COMMUNICATIONS NETWORK CONNECTIONS FOR PROVISION OF TARGETED, STATUS-BASED MESSAGING

RELATED APPLICATIONS

This application claims the benefit of the earlier filing date under 35 U.S.C. § 119(e) of U.S. Provisional Application Ser. No. 61/990,081 (filed 2014 May 7).

BACKGROUND

A general communications network comprises a collection of terminal nodes networked together via communications links and intermediate nodes to facilitate message and data communications between or amongst the terminal nodes. For example, a computer network is a communications network of computer terminal nodes networked together via communications links and intermediate nodes to facilitate data exchanges between or amongst the computer terminal nodes. Further, a wide area network (WAN) is a computer network that spans or covers a broad area (e.g., a communications network that spans across metropolitan or regional areas). The Internet is an interactive global system of interconnected computer networks.

In computer networking, a "port" serves as an application-specific or process-specific software construct serving as a communications network endpoint of a terminal node, which is associated with an IP address of the host node and the specific communications protocol. A computer terminal of a network may share a single physical connection to the network (e.g., a packet-switched network, such as the Internet), and each port of the computer uniquely identifies a respective different application or process running on the computer. Certain transport layer protocols of the Internet (e.g., Transmission Control Protocol (TCP) and User Datagram Protocol (UDP)) reflect protocols that primarily use ports that are identified for each address and protocol by a port number. The port number, along with the IP address of the host computer, form the destination address for a communications session. For example, data packets are routed across the network to a specific destination IP address for the host computer, and then to the specific destination port number associated with the respective process or application of the host computer.

TCP is a core protocol of the Internet protocol (IP) suite, which provides reliable, ordered and error-checked delivery of a stream of packets between programs running on computers connected to the Internet. Web browsers use TCP when they connect to servers on the Internet, and it is used to deliver email and transfer files from one location to another. To establish a connection, TCP uses a three-way handshake. The server to which the client connects binds to and listen at one or more ports for TCP connections. To establish a TCP connection, the client first transmits a TCP synchronize message (SYN) to the server. The client sets a random value A as the sequence number for the SYN segment. Upon receiving the TCP SYN message, the server replies with a synchronize acknowledge (SYN-ACK) message. The server sets a sequence number for the acknowledgment segment to the value of the SYN sequence number plus one (A+1), and sets another random number B as the sequence number for the SYN-ACK packet. Finally, upon receiving the SYN-ACK, the client replies with an acknowledge (ACK) message back to the server. The client sets a sequence number for the ACK segment to the same value of the received SYN-ACK segment (A+1), and sets the sequence number for the ACK packet to the sequence number value of the SYN-ACK packet plus one (B+1). At this point, both the client and server have received an acknowledgment of the connection, and a full-duplex communications connection is established. The first and second steps (the SYN and SYN-ACK steps) establish the connection parameter (sequence number) for one direction and it is acknowledged. The second and third steps (the SYN-ACK and ACK steps) establish the connection parameter (sequence number) for the other direction and it is acknowledged. Resources (e.g., web servers and services) connected to the Internet are identified via the Domain Name System (DNS), which serves as a hierarchical distributed naming system. The DNS associates various information with respective domain names assigned to Internet resource entities. For example, the Internet DNS associates domain names to respective associated numerical IP addresses for the targeted or destination resources connected to the Internet.

Web pages accessed over the Internet are generally serviced via Hypertext Transfer Protocol (HTTP) and Hypertext Transfer Protocol Secure (HTTPS), which function as request-response protocols for interactive communication over computer networks (HTTPS providing secure network communications). Further, HTTP and HTTPS function as client-server based communications protocols, where, for example, a web-browser application running on a one terminal node serves as the client node, and a web-site hosted on another terminal node serves as the server node. Web pages serviced by HTTP or HTTPS typically utilize ports 80 and 443. Simple Mail Transfer Protocol (SMPT) is a network protocol for electronic mail (e-mail) transmission, Post Office Protocol (POP3) is an application-layer network protocol used by local e-mail clients to retrieve e-mail from a remote server, and Internet Message Access Protocol (IMAP) is a network protocol for e-mail retrieval and storage. Further, File Transfer Protocol (FTP) is a network protocol used to transfer computer files from one network host to another, Secure Shell (SSH) is a cryptographic network protocol for initiating secure text-based shell sessions on remote network hosts, and Telnet is an application protocol used to provide a bidirectional interactive text-oriented communication facility over a network. HTTP, HTTPS, SMTP, POP3, IMAP, SSH, FTP, Telnet and a variety of other protocols are typically employed over TCP-based networks, such as the Internet, and are thus encapsulated in TCP. When a user node (e.g., a computer terminal node running a web browser) seeks to access a web page, the following steps are involved: (1) a DNS request to obtain the IP address for the hosting node (the IP address is returned via a DNS response); (2) a TCP request to the IP address obtained via the DNS response on the appropriate port; and (3) a GET request, within the HTTP of HTTPS portion of the protocol running over TCP, containing a user agent string providing information regarding the device making the request.

Web page data is typically transferred transparently through a customer premise WAN device (e.g., a terminal node) without interception. Exceptions, however, exist where data may be intercepted, such as (a) when all traffic is captured such as in a login case for a guest or pay network (e.g., a WiFi network) and (b) where acceleration is applied to the web page data, providing the original content in a performance enhanced manner. Further, terminals often host their own HTTP/HTTPS pages for a specific domain name or IP address associated with the LAN port of that terminal. Such pages are served to the requesting browser application independently of the access of other HTTP/HTTPS pages on the Internet.

In various instances, when operating and providing a communications service (e.g., an Internet service provider (ISP) service), there is a desire or need to provide specific or targeted messaging to the end user, for example, based on an associated status of the network or user account (e.g., messages regarding the state of the network, the state of the local terminal, or status information regarding the user account). Currently, such messaging is primarily provided via one of the following methods: (1) the user receives the message when going to the HTTP/HTTPS server of the terminal; (2) the user receives the message via an email communication; (3) a user web page request is redirected by a central device; or (4) the user accesses the message on a message board or other HTTP/HTTPS server hosted by the ISP. These methods, however, are subject to various deficiencies and inefficiencies. For example, in the case of receiving the messaging via the HTTP/HTTPS server of the terminal or other server hosted by the ISP, the user may access such resources on a very infrequent basis, and thus the ISP cannot be assured of prompt or reliable delivery. Further, in the case of email delivery, email messaging is not real-time, and thus the ISP cannot be assured of prompt delivery in conjunction with an associated status that may be the topic of the messaging. Moreover, in the cases of an HTTP/HTTPS server of the terminal, email messaging, redirection by a central device and messaging via a server hosted by the ISP, such methods require an active and properly functioning WAN connection, and thus (especially with respect to messaging regarding network status, such as a network outage) such messaging would not reach the user in a timely fashion.

What is needed, therefore, is an approach for reliable and timely provision of targeted, status-based messaging to a user-terminal node in a computer network, such as a wide area resource-based network (e.g., the Internet).

Some Example Embodiments

Embodiments of the present invention advantageously address the foregoing requirements and needs, as well as others, by providing an approach for reliable and timely provision of targeted, status-based messaging to a user-terminal node in a computer network, such as a wide area resource-based network (e.g., the Internet).

In accordance with example embodiments of the present invention, TCP connections to certain ports (e.g., nominally ports 80 and 443) are intercepted for the provision of targeted, status-based messaging when certain circumstances associated with the messaging are present, and when certain additional conditions are met (e.g., a timer condition or other predefined condition meeting certain criteria, such as a periodic connection of a predefined period, etc.). In accordance with further example embodiments, such messaging may also be restricted to interactive connections by determining that there is a GET message from a user agent string that is likely to be a browser, which (in addition to providing a better opportunity for actually getting interactive web traffic versus non-interactive web traffic) provides benefits over DNS based solutions, because the customer premise WAN device sees all TCP traffic, but may not see a DNS request if the host terminal or a premise router performs DNS caching. By way of example, scenarios where a web request (e.g., a request on port 80, 443 or other configured port) would be intercepted to provide such targeted, status-based messaging include: (1) Account Volume State—when a user account is approaching or has exceeded a data quota, such as a maximum data volume plan; (2) Maintenance—when a planned outage is scheduled; (3) Outage—when the WAN link is currently out or degraded; and (4) Account State—when key information about a user account needs to be proactively communicated.

In accordance with example embodiments, a method comprises receiving, by a terminal node, a message originating from a client terminal, wherein the terminal node serves as an entry point to, and services data communications connections over, a wide area network (WAN) for the client terminal. It is determined that the message comprises an initiation request for establishing a data communications connection over the wide area network between the client terminal and a remote server, and that an intercept state is in effect. The data communications connection is established as a local connection between the client terminal and the terminal node. The data communications connection is serviced via a local server function, wherein the servicing of the data communications connection via the local server function comprises a provision of status-based messaging to the client terminal. By way of example, the status based messaging comprises information regarding one or more of status of potential communications links between the client terminal and the WAN, status of the WAN, status of a subscription or other account associated with the client terminal, promotions or other services or items of interest relevant to a subscriber associated with the client terminal, and other issues relevant to the client terminal or to a subscriber associated with the client terminal. According to a further aspect, upon determining that the intercept state is in effect, it is determined that a port associated with the requested data communications connection is configured as a port subject to the intercept state. According to a further aspect, upon determining that the intercept state is in effect, it is determined that an intercept frequency parameter is satisfied. Further, upon determining that the intercept frequency parameter is satisfied, it is determined that a port associated with the requested data communications connection is configured as a port subject to the intercept state.

In accordance with further embodiments of the method, upon establishing the data communications connection as a local connection between the client terminal and the terminal node, a protocol session is established over the data communications connection. A further message is received from the client terminal via the protocol session requesting a service associated with the remote server. The method then proceeds with the servicing of the data communications connection via the local server function. According to a further aspect, upon receiving the further message from the client terminal via the protocol session requesting the service associated with the remote server, it is determined that the requested service is an interactive service. The method then proceeds with the servicing of the data communications connection via the local server function.

In accordance with further embodiments of the method, upon establishing the data communications connection as a local connection between the client terminal and the terminal node, a protocol session is established over the data communications connection, and a further message originating from the client terminal is received via the protocol session. It is then determined whether the further message comprises a request for a particular service associated with the remote server. If it is determined that the further message does not comprise the request for the particular service, then the method further comprises routing the data communications connection to the remote server as originally requested.

Otherwise, if it is determined that the further message comprises the request for the particular service, then the method further comprises proceeding with the servicing of the data communications connection via the local server function. According to a further aspect, if it is determined that the further message comprises the request for the particular service, before proceeding with the servicing of the data communications connection via the local server function, the method further comprises determining whether the service is an interactive service. If it is determined that the service is not an interactive service, then the method further comprises routing the data communications connection to the remote server as originally requested. Otherwise, if it is determined that the service is an interactive service, then the method proceeds with the servicing of the data communications connection via the local server function.

In accordance with example embodiments, a communications terminal node comprises a receiver configured to receive a message originating from a client terminal, wherein the terminal node serves as an entry point to, and services data communications connections over, a wide area network (WAN) for the client terminal; and a communications processor configured to determine that the message comprises an initiation request for establishing a data communications connection over the wide area network between the client terminal and a remote server, and to determine that an intercept state is in effect. Upon determining that the message comprises the initiation request and that the intercept state is in effect, the communications processor is configured to establish the data communications connection as a local connection between the client terminal and the terminal node, and to service the data communications connection via a local server function, wherein the servicing of the data communications connection via the local server function comprises a provision of status-based messaging to the client terminal. By way of example, the status based messaging comprises information regarding one or more of status of potential communications links between the client terminal and the WAN, status of the WAN, status of a subscription or other account associated with the client terminal, promotions or other services or items of interest relevant to a subscriber associated with the client terminal, and other issues relevant to the client terminal or to a subscriber associated with the client terminal. According to a further aspect, upon determining that the intercept state is in effect, the communications processor is configured to determine that a port associated with the requested data communications connection is configured as a port subject to the intercept state. According to a further aspect, upon determining that the intercept state is in effect, the communications processor is configured to determine that an intercept frequency parameter is satisfied. Further, upon determining that the intercept frequency parameter is satisfied, the communications processor is configured to determine that a port associated with the requested data communications connection is configured as a port subject to the intercept state.

In accordance with further embodiments of the terminal node, upon establishing the data communications connection as a local connection between the client terminal and the terminal node, the communications processor is configured to establish a protocol session over the data communications connection, and the receiver is configured to receive a further message from the client terminal via the protocol session requesting a service associated with the remote server. Upon the receipt of the further message requesting the service associated with the remote server, the communications processor is configured to proceed with the servicing of the data communications connection via the local server function. According to a further aspect, upon receiving the further message from the client terminal via the protocol session requesting the service associated with the remote server, the communications processor is configured to determine that the requested service is an interactive service, and to then proceed with the servicing of the data communications connection via the local server function.

In accordance with further embodiments of the terminal node, upon establishing the data communications connection as a local connection between the client terminal and the terminal node the communications processor is configured to establish a protocol session over the data communications connection, and the receiver is configured to receive a further message originating from the client terminal via the protocol session. Upon the receipt of the further message originating from the client terminal via the protocol session, the communications processor is configured to determine whether the further message comprises a request for a particular service associated with the remote server. If the communications processor determines that the further message does not comprise the request for the particular service, then the communications processor is configured to route the data communications connection to the remote server as originally requested. Otherwise, if the communications processor determines that the further message comprises the request for the particular service, then the communications processor is configured to proceed with the servicing of the data communications connection via the local server function. According to a further aspect, if the communications processor determines that the further message comprises the request for the particular service, before proceeding with the servicing of the data communications connection via the local server function, the communications processor is configured to determine whether the service is an interactive service. If the communications processor determines that the service is not an interactive service, then the communications processor is configured to route the data communications connection to the remote server as originally requested. Otherwise, if the communications processor determines that the service is an interactive service, then the communications processor is configured to proceed with the servicing of the data communications connection via the local server function.

Still other aspects, features, and advantages of embodiments of the present invention are readily apparent from the following detailed description, simply by illustrating a number of particular embodiments and implementations, including the best mode contemplated for carrying out the present invention. The present invention may be realized via other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Embodiments of the present invention are illustrated by way of example, and not by way of limitation, in the figures of the accompanying drawings, in which like reference numerals refer to similar elements and in which:

FIG. 5 illustrates a chip set upon which example embodiments of the present invention may be implemented.

DETAILED DESCRIPTION

Approaches for reliable and timely provision of targeted, status-based messaging to user-terminal nodes in a computer network, such as a wide area resource-based network (e.g., the Internet), are described. In the following description, for the purposes of explanation, numerous specific details are set forth in order to provide a thorough understanding of the present invention. The present invention is not intended to be limited based on the described embodiments, and various modifications will be readily apparent. It will be apparent that the invention may be practiced without the specific details of the following description and/or with equivalent arrangements. Additionally, well-known structures and devices may be shown in block diagram form in order to avoid unnecessarily obscuring the invention. Further, the specific applications discussed herein are provided only as representative examples, and the principles described herein may be applied to other embodiments and applications without departing from the general scope of the present invention.

In accordance with example embodiments of the present invention, network connections (e.g., TCP connections) to certain ports (e.g., ports 80 and 443) are intercepted for the provision of targeted, status-based messaging when certain circumstances associated with the messaging are present, and/or when certain additional conditions are met (e.g., a timer condition or other predefined condition meeting certain criteria, such as a periodic connection of a predefined period, etc.). In accordance with further example embodiments, such messaging may also be restricted to interactive connections by detecting a GET message from a user agent string that is likely to be a browser. Provision of messaging in such a manner provides for more reliable detections of interactive web traffic versus non-interactive web traffic, and provides benefits over DNS based solutions, because the customer premise WAN device may see all TCP traffic, but may not see a DNS request if the host terminal or a premise router performs DNS caching. By way of example, scenarios where a web request (e.g., a request on port 80, 443 or other configured port) would be intercepted to provide such targeted, status-based messaging include: (1) Account Volume State—when a user account is approaching or has exceeded a data quota, such as a maximum data volume plan; (2) General Account State—when key information about a user account needs to be proactively communicated; (3) Maintenance—when a planned outage is scheduled; and (4) Outage—when the WAN link is currently out or degraded.

Figure 1:
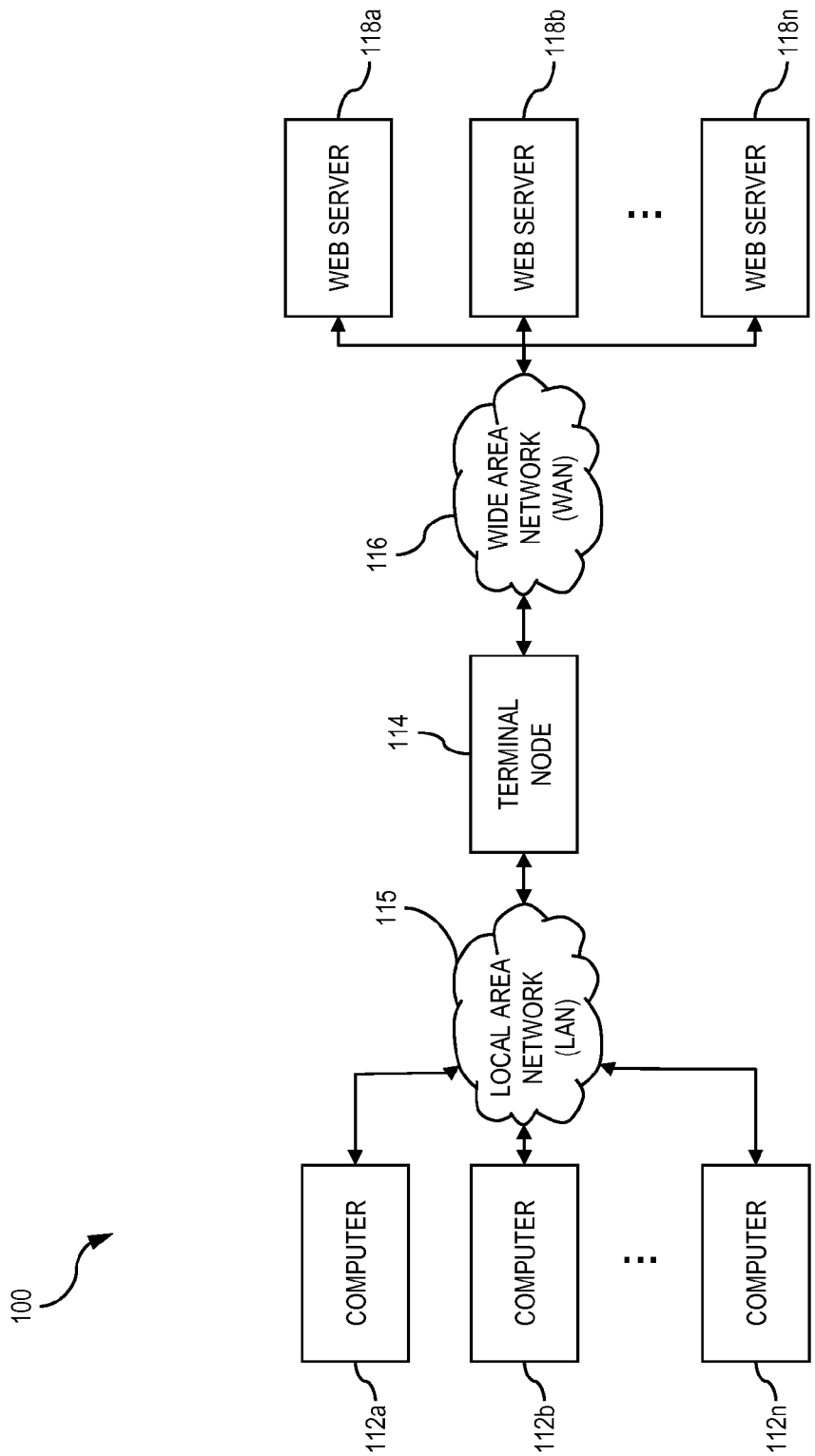
FIG. 1 illustrates a block diagram depicting a computer connection, for accessing a web server via the Internet, including a terminal node for providing reliable targeted, status-based messaging, in accordance with example embodiments of the present invention.

FIG. 1 illustrates a block diagram 100 depicting a computer connection, for accessing a web server via the Internet, including a terminal node for providing reliable targeted, status-based messaging, in accordance with example embodiments of the present invention. The user terminals or computers 112a, 112b, . . . , 112n may, for example, host web browser applications for accessing the web servers 118a, 118b, . . . , 118n over the wide area network (WAN) 116 (e.g., the Internet). The terminals 112a, 112b, . . . , 112n access the WAN 116 via a terminal node 114 (e.g., a router or satellite terminal). By way of example, the terminal node 114 may be a local node of an enterprise network (e.g., local area network (LAN) 115) to which the computers 112a, 112b, . . . , 112n belong. In such a scenario, targeted, status-based messaging may be provided by the IT department that controls the enterprise network, to provide associated information regarding network or user account status. By way of further example, the terminal node 114 may be a terminal node of an Internet service provider (ISP) that provides Internet access to subscribers operating via the terminals 112a, 112b, . . . , 112n. In that case, targeted, status-based messaging may be provided to subscribers by the ISP (e.g., to provide messaging regarding the WAN of the ISP or the subscriber account. Alternatively, another entity may control the terminal node 114, and provide other targeted, status-based messaging regarding topics specific to that entity. Further, in either case, the LAN 115 may alternatively comprise a wide area network or regional network via which an enterprise interconnects user terminals or computers of different offices, or via which an ISP provides Internet services to subscribers of a respective geographical region. As would be recognized, various networking scenarios could be implemented to interconnect the terminal node 114 to respective remote terminals (user terminals) serviced by the terminal node, without departing from the scope or principles of example embodiments of the present invention.

In accordance with example embodiments, approaches for reliable targeted, status-based messaging can thus be provided or facilitated via the terminal node 114 based on interception of interactive communications, such as HTTP and or HTTPS web requests, and providing the messaging thereby. By way of example, such approaches may include (1) occasional interception of HTTP/HTTPS web requests, and permitting continued operation after delivery of the desired messaging, (2) interception of HTTP/HTTPS web requests when certain circumstances are present (e.g., when the network is in a certain state), and ceasing interception when the circumstances abate, (3) interception of both HTTP and HTTPS web requests, and (4) interception of connections that are determined as likely to be HTTP or HTTPS interactive web requests, and not other non-interactive applications utilizing the same ports.

According to certain embodiments, the terminal node 114 intercepts HTTP/HTTPS web requests only when certain statuses are detected or certain circumstances are determined (e.g., when the network is in a certain state or when certain circumstances exist regarding the respective subscriber account), and ceasing interception when the circumstances abate. To determine whether the associated circumstances are present, the terminal may either be configured to monitor for the respective circumstances, or messaging may be provided to the terminal node to alert it of the pending circumstances. In the second case, such messaging may be provided by a server or other node connected to the network and controlled by the respective ISP or enterprise IT department, where the server or other node are configured to monitor the network and subscriber accounts, and to notify the terminal node accordingly in order to initiate interception of certain communications and to provide the associated messages accordingly. Such target circumstances may comprise any number of conditions with respect to which targeted, status-based subscriber or user messaging may be desired. For example, such circumstances may include (1) determining that a respective WAN link is inoperable or degraded, (2) determining that the user or subscriber account has reached a threshold data usage level with respect to an allotted data volume allowance, (3) determining that the user or subscriber has been placed into a status-class due to non-payment (billing suspension) or other suspensions or network violations, (4) providing notification of current or future network/server maintenance events that could impact service, and (5) and providing notification of promotions or other services or items of interest, which may be applicable to the user or subscriber, being provided by the ISP or the hosting enterprise or other related entities. The terminal node 114 would be configured to perform an interception/ redirection upon determining or being notified of the presence of the respective circumstances (e.g., statuses or states of the network and/or the subscriber account status). Then, once the terminal node 114 determines that the present state satisfies the conditions for interception, the terminal begins initiation of the interception and messaging process.

According to further embodiments, a frequency or timing criteria may also be applied. By way of example, once the terminal node determines that a state or circumstance for interception exists, the terminal applies a frequency or timing factor to determine whether the interception and messaging process should be initiated. By way of example, the terminal node may be configured to perform the interception and messaging at a given point in time after an interactive session (e.g., a web browsing session) has begun via a specific terminal/computer 112 (or specific identified list of terminals). In such an example, the terminal node may detect the initiation of an interactive session by the terminal 112a, and thereupon may start a timer. The terminal node may then perform the interception and messaging process based on a certain frequency. In such an example, once the terminal node determines that the state or circumstance for interception exists, before initiating the interception and messaging process, the terminal node determines whether the current point in time satisfies a predetermined frequency criteria. Further, once the state or circumstance for interception arises, the terminal node may be configured to periodically perform the interception and messaging process at the given frequency. For example, the frequency may be a predefined parameter, or may be dynamically configurable by a system operator. Further the interception frequency may follow any of a number of models, such as (1) a probability based model whereby the interception is performed randomly based on a percentage of connections (e.g., randomly intercept only 10% of the TCP connections), (2) a timer based model, intercepting periodically at a predetermined or configurable period (e.g., intercept once every hour as long as the intercept state persists), (3) a deterministic counter based model based on a periodic counter that triggers interception (e.g., intercept once every N TCP connections), (4) a one-time model, intercepting only once during persistence of a given intercept state, and (5) an every-time model, intercepting all TCP connections during persistence of a given intercept state.

Figure 2:
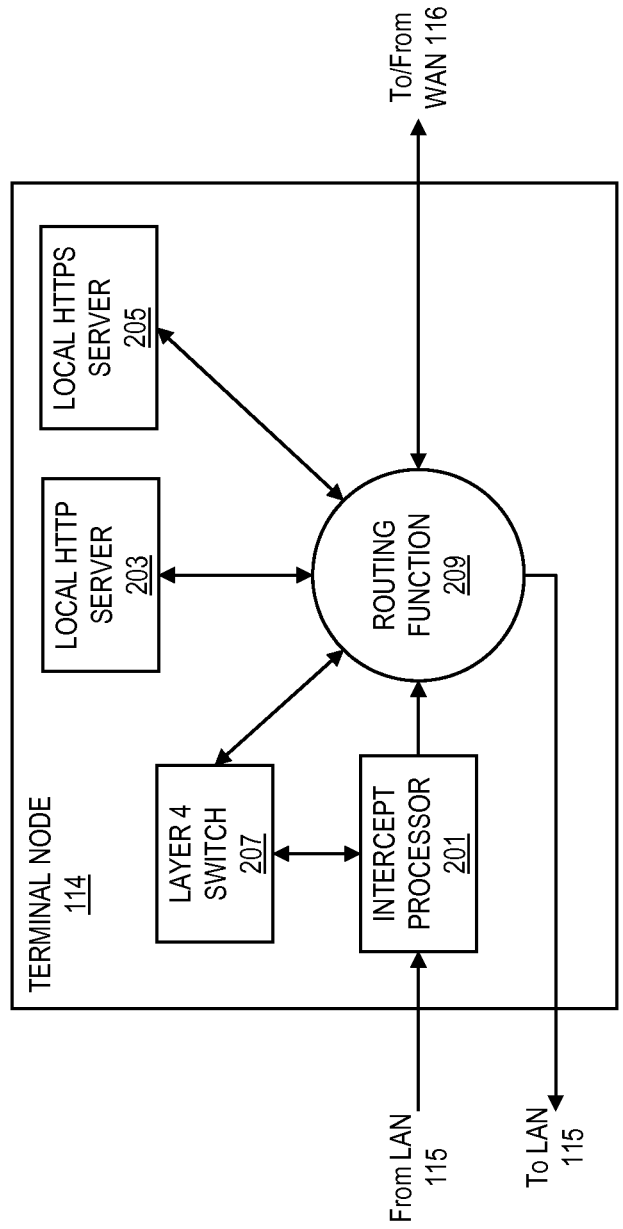
FIG. 2 illustrates a block diagram depicting internal configuration of the terminal node for intercepting network connections and providing reliable targeted, status-based messaging (e.g., the terminal node of FIG. 1), in accordance with example embodiments of the present invention.
Figure 3A:
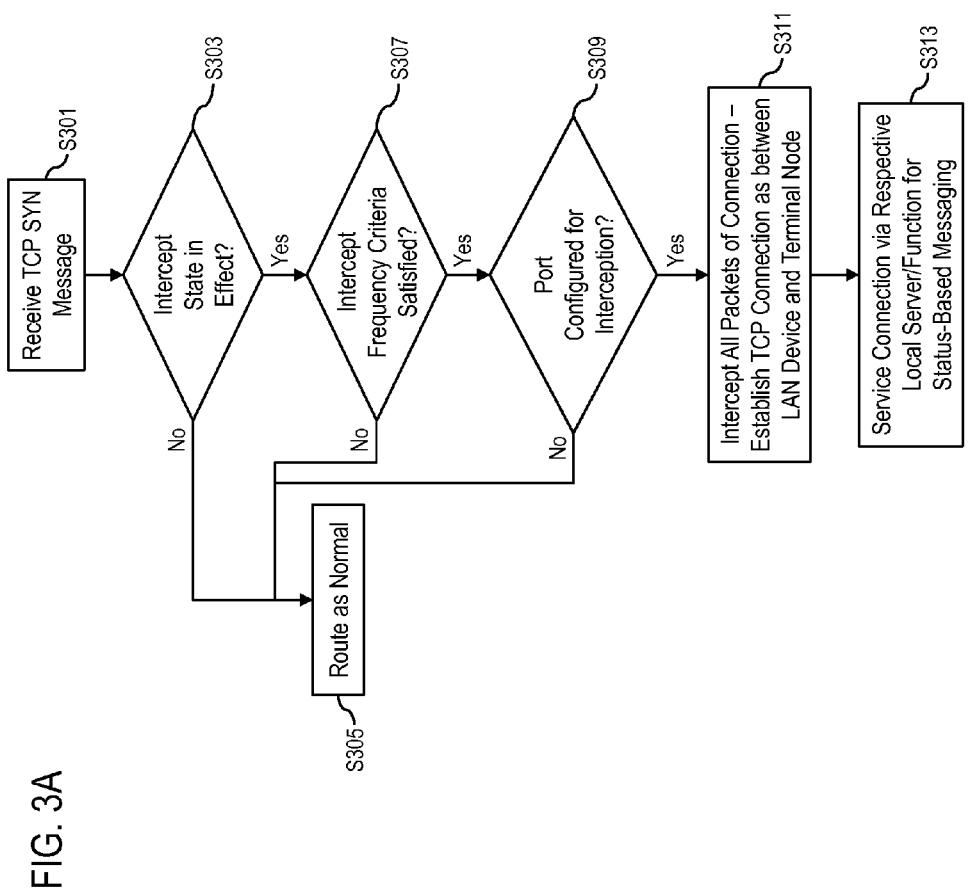
FIGS. 3A and 3B illustrate flow charts depicting processes for intercepting network connections and providing reliable targeted, status-based messaging, in accordance with example embodiments of the present invention.
Figure 3B:
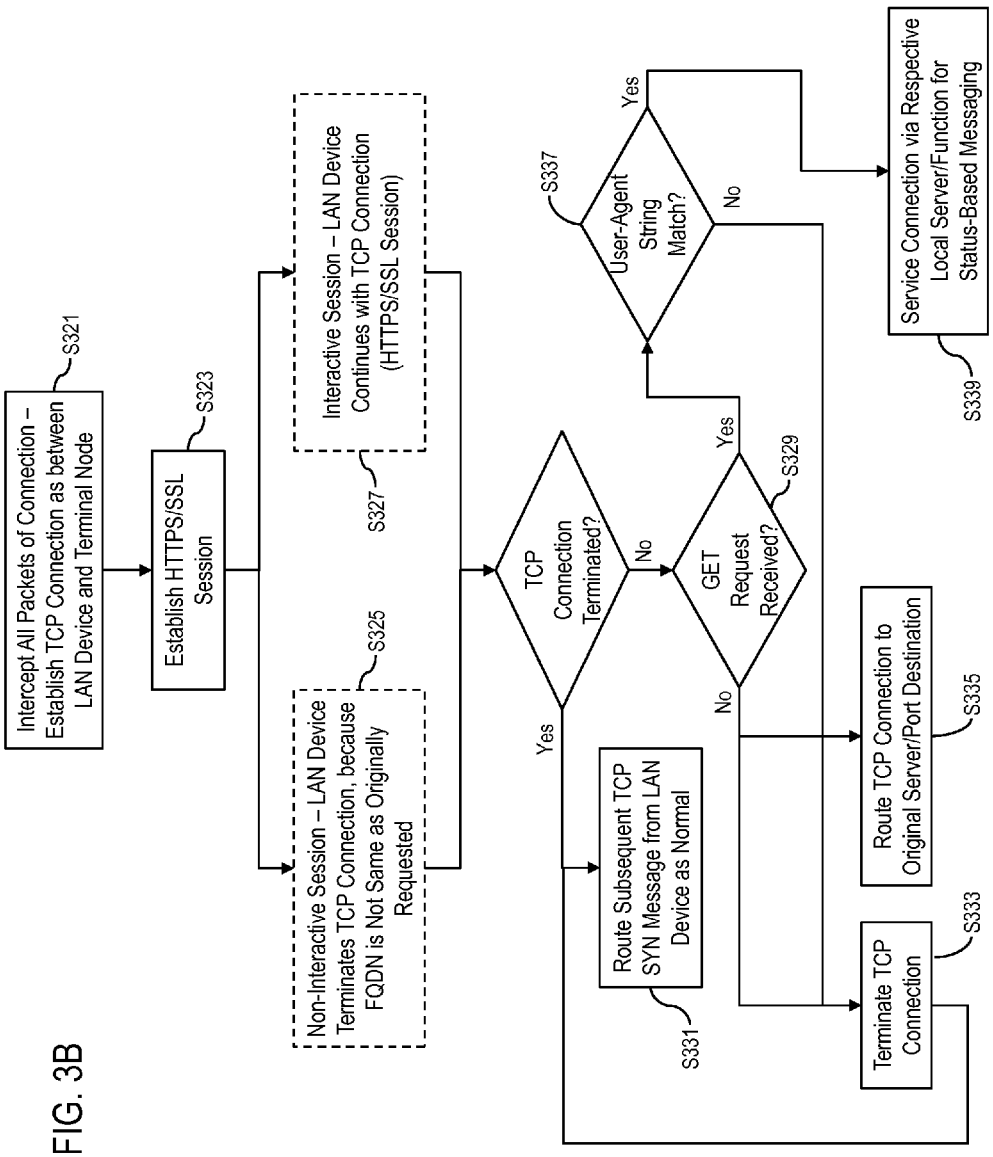

FIG. 2 illustrates a block diagram depicting internal configuration of a terminal node for intercepting network connections and providing reliable targeted, status-based messaging (e.g., the terminal node 114 of FIG. 1), in accordance with example embodiments of the present invention. Further, FIGS. 3A and 3B illustrate flow charts depicting processes for intercepting network connections and providing reliable targeted, status-based messaging, in accordance with example embodiments of the present invention. According to example embodiments, with reference to FIG. 2, the terminal node 114 includes an intercept processor 201, a Layer 4 switch 207 and a routing function 209. By way of example, the Layer 4 switch comprises a layer 3 switching protocol or technology configured to also determine and consider the type of network traffic (e.g., distinguish between HTTP, FTP or VoIP traffic), where the layer 3 switching protocol or technology would switch based only on the destination IP address contained within the header of IP datagram. Layer 4 switching provides for additional datagram inspection (e.g., reading the port numbers found in the transport layer header, such as TCP or UDP ports) based upon which routing decisions are made. The terminal node 114 may further include a local HTTP server (or server function) 203 and a local HTTPS server (or server function 205), or alternatively the local HTTP and HTTPS servers (or server functions may be deployed separate from the terminal node 114. In either case, the HTTP and HTTPS servers (or server functions) are implemented and controlled by the entity providing the targeted, status-based messaging. According to one embodiment, the terminal node 114 may be configured to intercept certain communications associated with one or more predetermined or dynamically configurable ports (e.g., TCP connections to the specific port(s), such as ports 80 and 443).

According to one embodiment, with reference to FIG. 3A, the terminal node 114 receives a TCP SYN message from a one of the computer terminals 112, via the LAN 115 (S301). The TCP SYN message is destined for a server based on an IP address that would normally be routed across the WAN. The terminal node then determines whether an intercept state is in effect for that connection (S303). By way of example, in the case of a particular subscriber that has reached a threshold for the respective subscription plan, the terminal node may match the source IP address or other identifying information associated with the subscriber to a database to determine whether the connection is for that subscriber. Alternatively, by way of further example, in the case of a network status that triggers an interception state (e.g., in the case of a network outage or a planned outage for network maintenance regarding which targeted, status-based messaging is desired), the terminal node may determine that certain connections are to be intercepted. For example, the routing function 209 routes the associated packets to the WAN 116 uninterrupted. If the terminal node determines that there is an intercept state in effect for that connection, then (in the case of an embodiment where a further frequency factor is employed) the terminal determines whether the intercept frequency factor or criteria is satisfied (S307). If the terminal node determines that the frequency criteria is satisfied for that connection, then the terminal node determines whether the SYN is for a TCP connection with a port that is configured for interception (S309). If the terminal node determines that the SYN is for a TCP port configured for interception, then the terminal node intercepts all future packets of that TCP connection—e.g., the TCP connection is established as between the local LAN device (e.g., the computer terminal 112) and the terminal node 114 as the destination server/port (S311). The terminal node then services the connection for the respective targeted, status-based messaging (S313). If either (in S303) the terminal node determines that there is no intercept state in effect for the connection, or (in S307) the terminal node determines that the intercept frequency factor or criteria is not satisfied for that connection, or (in S309) the terminal node determines that the SYN is not for a TCP port configured for interception, then the SYN message and further messages for the TCP connection will be routed as normal (S305).

By way of example, in the case of interception, the terminal node intercepts all future packets for the particular TCP connection and services them locally as if the packets had been addressed directly to the IP address of the terminal node. By way of example, by means of the Layer 4 Switch 207 the terminal node services all packets for the respective TCP connection as if it were the originally addressed destination server/port number. More specifically, the terminal node brings up the TCP connection and connects it to the appropriate listener application for the port. For example, the terminal node services a connection for port 80 via the local HTTP server or function 203, and services a connection for port 443 via the local HTTPS server or function 205. All communications over the respective TCP connection will thereby be between the LAN device (e.g., the terminal 112) and the terminal node 114, rather than between the LAN device and the originally specified web server over the WAN or Internet. The respective targeted, status-based messaging is then provided via the respective local HTTP/HTTPS server or function of the terminal node.

According to a further embodiment, the terminal node 114 may be configured to intercept only interactive requests/connections, and thus, prior to initiating interception, the terminal may be further configured to validate that the connection consists of an interactive session. For example, in the case of ports 80 and 443, not every connection to these ports are likely to be interactive sessions (e.g., interactive web page requests) for which the user is intended to receive the respective status-based messaging. Some examples of non-interactive applications that utilize port 80 and 443 include telemetry, software updates, virtual private network connections (VPNs), etc., where redirecting to a web server in the terminal will not serve the intended function of the user receiving the respective messaging. Accordingly, the terminal may be configured to determine whether the connection is likely to be for an interactive session, such as a web page request.

By way of example, with reference to FIG. 3B, in the intercept state, once the local TCP connection has been established as between the local LAN device and the terminal node as the destination server/port (e.g., via the process of FIG. 3A through S311), the terminal node continues to process communications via the connection. In one instance, where the TCP connection is for an HTTPS session, the terminal proceeds with the secure sockets layer (SSL) negotiation to establish a secure session (S323). Then, because the terminal node is not the intended destination, the following may occur (S325): (a) the HTTPS sessions will be established; (b) the LAN device browser (e.g., for an interactive webpage) provides a warning message informing the user that the device to which the session is connected is not the original fully qualified domain name (FQDN), sometimes also referred to as an absolute domain name, of the initial request—the FQDN reflects the domain name that specifies an exact location in the tree hierarchy of the Domain Name System (DNS), specifying all domain levels including the top-level domain and the root zone; (c) the LAN device application (e.g., in the case of a non-interactive session or webpage) may terminate the TCP connection. In the event that the TCP connection is terminated in this manner, the terminal node may route a subsequent TCP SYN message from the respective LAN device as normal (S331).

For any case where the TCP connection is not terminated (S327), the terminal node then looks for a subsequent GET request from the LAN device for a desired web page (S329). If the terminal node receives another request other than a GET request, it may either terminate the TCP connection and allow it to go through the next time (S333→S331), or route the TCP connection on behalf of the user to the originally intended server (S335). If the terminal node receives a GET request, the terminal node determines whether the respective user-agent string matches one of a plurality of preconfigured strings that correspond to respective browser applications (S337), as opposed to another non-interactive application. For example, each of the different preconfigured strings may correspond to a different browser application (e.g., Internet Explorer, Google Chrome, Mozilla Firefox, etc.), and when the respective user-agent string matches in one of those preconfigured strings it can be determined that the client application of the LAN device is the respective web browser. Although it may be determined that the user-agent string matches that of a preconfigured web browser string, the respective TCP session may not necessarily be an interactive session, but the probability that it is an interactive application is significantly increased based on the determination. If the GET request does not match the user-agent string, then the terminal node may either terminate the TCP connection and allow it to go through the next time (S333S→331), or route the TCP connection on behalf of the user to the originally intended server (S335).

On the other hand, if the terminal node determines that the user-agent string matches a one of the preconfigured web browser application strings, then the terminal services the request locally by providing a connection to the local HTTP/HTTPS server or function to provide the respective status-based messaging (S339). By way of example, as discussed above, by means of the Layer 4 Switch 207, the terminal node services all packets for the respective TCP connection as if it were the originally addressed destination server/port number. More specifically, the terminal node brings up the TCP connection and connects it to the appropriate listener application for the port. For example, the terminal node services a connection for port 80 via the local HTTP server or function 203, and services a connection for port 443 via the local HTTPS server or function 205. All communications over the respective TCP connection will thereby be between the LAN device (e.g., the terminal 112) and the terminal node 114, rather than between the LAN device and the originally specified web server over the WAN or Internet. The respective targeted, status-based messaging is then provided via the respective local HTTP/HTTPS server or function of the terminal node.

Further, in accordance with another example embodiment, once the intercept is determined as appropriate and the connection is established, instead of routing the connection to the requested site, the terminal node 114 is configured to implement the connection to a local HTTP or HTTPS server, or an HTTP or HTTPS server application resident in the terminal, for provision of the respective status-based messaging. The HTTP or HTTPS server is configured to provide certain page content that is appropriate for or associated with the state (status-base) for which the intercept has occurred. Accordingly, the respective HTTP or HTTPS server or server application may be programmed to provide a different message page for each state (status-base) for which intercepts are configured. Such a status-based message web page provided for the respective intercepted connection may take any form, such as: (1) informational messaging to educate the user of the state (e.g., network status or user account status); (2) notification of actions for the user to take—e.g., to impact the state; (3) providing references for the user to seek help or access further information regarding the state (e.g., customer service contacts or a self-help webpage); and (4) providing a link to the original IP address or URL to which the user was attempting to access, to facilitate re-initiation of the original request after consuming the information messaging of the terminal-served web page and/or correcting the account or network status on which the intercept was based.

Figure 4:
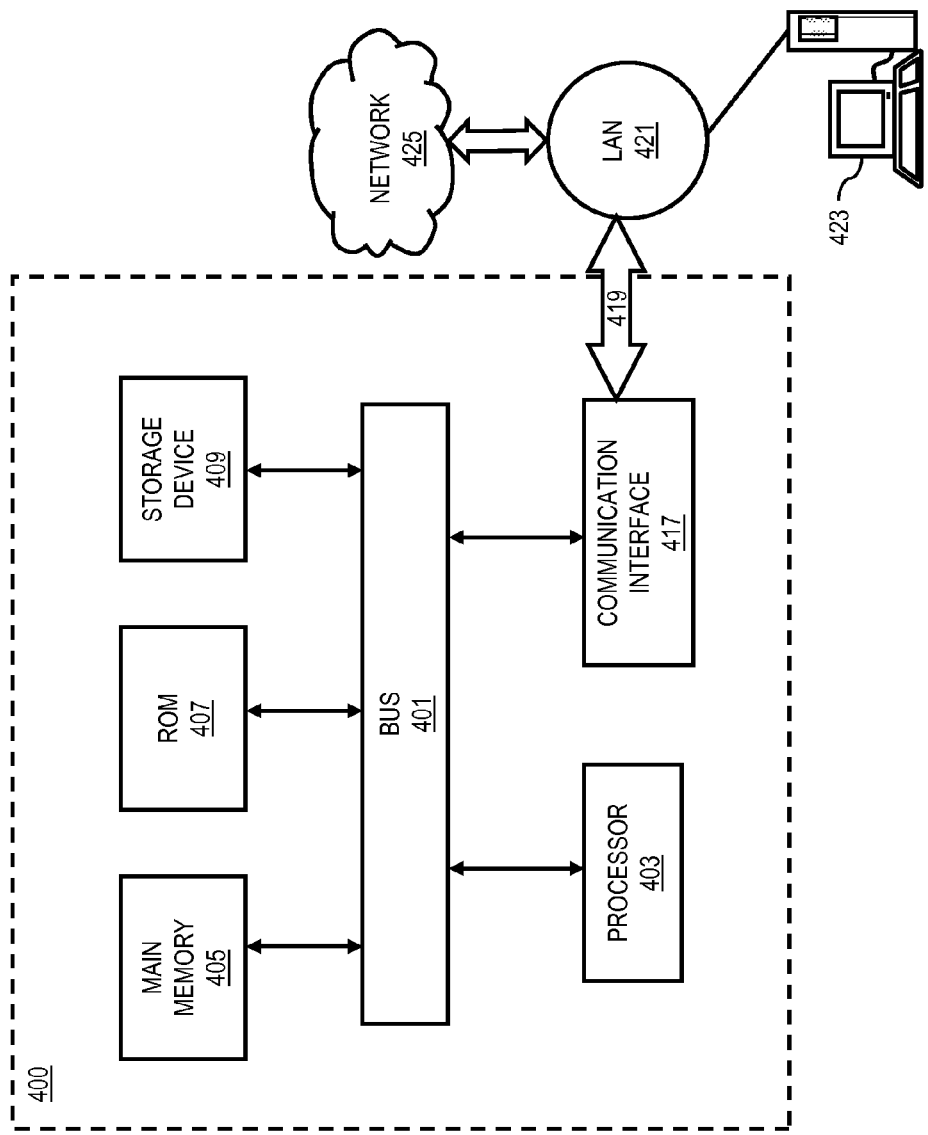
FIG. 4 illustrates a computer system upon which example embodiments according to the present invention can be implemented.

FIG. 4 illustrates a computer system upon which example embodiments according to the present invention can be implemented. The computer system 400 includes a bus 401 or other communication mechanism for communicating information, and a processor 403 coupled to the bus 401 for processing information. The computer system 400 also includes main memory 405, such as a random access memory (RAM) or other dynamic storage device, coupled to the bus 401 for storing information and instructions to be executed by the processor 403. Main memory 405 can also be used for storing temporary variables or other intermediate information during execution of instructions to be executed by the processor 403. The computer system 400 further includes a read only memory (ROM) 407 or other static storage device coupled to the bus 401 for storing static information and instructions for the processor 403. A storage device 409, such as a magnetic disk or optical disk, is additionally coupled to the bus 401 for storing information and instructions.

According to one embodiment of the invention, an approach for reliable and timely provision of targeted, status-based messaging to a user-terminal node in a computer network, such as a wide area resource-based network (e.g., the Internet), in accordance with example embodiments, are provided by the computer system 400 in response to the processor 403 executing an arrangement of instructions contained in main memory 405. Such instructions can be read into main memory 405 from another computer-readable medium, such as the storage device 409. Execution of the arrangement of instructions contained in main memory 405 causes the processor 403 to perform the process steps described herein. One or more processors in a multi-processing arrangement may also be employed to execute the instructions contained in main memory 405. In alternative embodiments, hard-wired circuitry is used in place of or in combination with software instructions to implement the embodiment of the present invention. Thus, embodiments of the present invention are not limited to any specific combination of hardware circuitry and software.

The computer system 400 also includes a communication interface 417 coupled to bus 401. The communication interface 417 provides a two-way data communication coupling to a network link 419 connected to a local network 421. For example, the communication interface 417 may be a digital subscriber line (DSL) card or modem, an integrated services digital network (ISDN) card, a cable modem, or a telephone modem to provide a data communication connection to a corresponding type of telephone line. As another example, communication interface 417 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 417 sends and receives electrical, electromagnetic, or optical signals that carry digital data streams representing various types of information. Further, the communication interface 417, for example, includes peripheral interface devices, such as a Universal Serial Bus (USB) interface, a PCMCIA (Personal Computer Memory Card International Association) interface, etc.

The network link 419 typically provides data communication through one or more networks to other data devices. For example, the network link 419 provides a connection through local network 421 to a host computer 423, which has connectivity to a network 425 (e.g. a wide area network (WAN) or the global packet data communication network now commonly referred to as the "Internet") or to data equipment operated by service provider. The local network 421 and network 425 both use electrical, electromagnetic, or optical signals to convey information and instructions. The signals through the various networks and the signals on network link 419 and through communication interface 417, which communicate digital data with computer system 400, are example forms of carrier waves bearing the information and instructions.

The computer system 400 sends messages and receives data, including program code, through the network(s), network link 419, and communication interface 417. In the Internet example, a server (not shown) might transmit requested code belonging to an application program for implementing an embodiment of the present invention through the network 425, local network 421 and communication interface 417. The processor 403 executes the transmitted code while being received and/or store the code in storage device 239, or other non-volatile storage for later execution.

Further, terminology referring to computer-readable media or computer media or the like as used herein refers to any medium that participates in providing instructions to the processor of a computer or processor module or component for execution. Such a medium may take many forms, including but not limited to non-transitory non-volatile media and volatile media. Non-volatile media include, for example, optical disk media, magnetic disk media or electrical disk media (e.g., solid state disk or SDD). Volatile media include dynamic memory, such random access memory or RAM. Common forms of computer-readable media include, for example, floppy or flexible disk, hard disk, magnetic tape, any other magnetic medium, CD ROM, CDRW, DVD, any other optical medium, random access memory (RAM), programmable read only memory (PROM), erasable PROM, flash EPROM, any other memory chip or cartridge, or any other medium from which a computer can read data.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

FIG. 5 illustrates a chip set 700 upon which example embodiments of the present invention may be implemented. Chip set 700 includes, for instance, processor and memory components described with respect to FIG. 5 incorporated in one or more physical packages. By way of example, a physical package includes an arrangement of one or more materials, components, and/or wires on a structural assembly (e.g., a baseboard or printed circuit board) to provide one or more characteristics such as physical strength, conservation of size, and/or limitation of electrical interaction.

In one embodiment, the chip set 700 includes a communication mechanism such as a bus 701 for passing information among the components of the chip set 700. A processor 703 has connectivity to the bus 701 to execute instructions/programs and process information stored in, for example, a memory 705. The processor 703 may include one or more processing cores with each core configured to perform independently. A multi-core processor enables multiprocessing within a single physical package, such as two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, and/or one or more application-specific integrated circuits (ASIC) 709. A DSP 707 typically is configured to process real-time signals (e.g., sound or video) in real time independently of the processor 703. Similarly, an ASIC 709 can be configured to performed specialized functions not easily performed by a general purpose processor. Other specialized components to aid in performing the inventive functions described herein may include one or more field programmable gate arrays (FPGA) (not shown), one or more controllers (not shown), or one or more other special-purpose computer chips.

The processor 703 and accompanying components have connectivity to the memory 705 via the bus 701. The memory 705 may include both dynamic memory (e.g., RAM) and static memory (e.g., ROM) for storing executable instructions that, when executed by the processor 503 and/or the DSP 507 and/or the ASIC 509, perform the process of example embodiments as described herein. The memory 705 may also store the data associated with or generated by the execution of the process.

Further, the functionality of the example embodiments of the present invention may be provided by the chip set 700, in response to the processor 703 executing an arrangement of program instructions contained in memory 705. Execution of the program instructions contained in memory 705 causes the processor 703 to perform the process steps and generate the results described herein, or equivalents thereof. One or more processors in a multi-processing arrangement can also be employed to execute the program instructions. In alternative embodiments, hard-wired circuitry can be used in place of or in combination with software instructions to implement the example embodiments. Thus, embodiments of the present invention are not limited to any specific combination of hardware circuitry and software.

Moreover, as will be appreciated, a module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. Moreover, the methods, processes and approaches described herein may be processor-implemented using processing circuitry that may comprise one or more microprocessors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in a computer memory store.

While example embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
 receiving, by a terminal node, a message originating from a client terminal, wherein the terminal node serves as an entry point to, and services data communications connections over, a wide area network (WAN) for the client terminal;
 determining that the message comprises an initiation request for establishing a data communications session over the wide area network between the client terminal and a remote server;
 determining that an intercept state is in effect;
 establishing the data communications session as a local session between the client terminal and the terminal node, and establishing a protocol session for the data communications session;
 servicing the data communications session via a local server function, wherein the servicing of the data communications session via the local server function comprises a provision of status-based messaging to the client terminal, and wherein the status-based messaging is targeted for a user account under which the data communications session is requested;

receiving a further message originating from the client terminal via the protocol session;

determining whether the further message comprises a request for a particular service associated with the remote server; and if it is determined that the further message does not comprise the request for the particular service, then the method further comprises routing the data communications session to the remote server as originally requested; and otherwise, if it is determined that the further message comprises the request for the particular service, then the method further comprises proceeding with the servicing of the data communications session via the local server function.

2. The method according to claim 1, wherein if it is determined that the further message comprises the request for the particular service, before proceeding with the servicing of the data communications session via the local server function, the method further comprises:

determining whether the service is an interactive service; and if it is determined that the service is not an interactive service, then the method further comprises routing the data communications session to the remote server as originally requested; and otherwise, if it is determined that the service is an interactive service, then the method proceeds with the servicing of the data communications session via the local server function.

3. A communications terminal node comprising:

a receiver configured to receive a message originating from a client terminal, wherein the terminal node serves as an entry point to, and services data communications connections over, a wide area network (WAN) for the client terminal; and a communications processor configured to determine that the message comprises an initiation request for establishing a data communications session over the wide area network between the client terminal and a remote server, and to determine that an intercept state is in effect and that an intercept frequency parameter is satisfied; and wherein, upon determining that the message comprises the initiation request and that the intercept state is in effect, the communications processor is configured to establish the data communications session as a local session between the client terminal and the terminal node, to establish a protocol session for the data communications session, and to service the data communications session via a local server function, wherein the servicing of the data communications session via the local server function comprises a provision of status-based messaging to the client terminal, and wherein the status-based messaging is targeted for a user account under which the data communications session is requested;

wherein the receiver is configured to receive a further message originating from the client terminal via the protocol session;

wherein, upon the receipt of the further message originating from the client terminal via the protocol session, the communications processor is configured to determine whether the further message comprises a request for a particular service associated with the remote server; and wherein, if the communications processor determines that the further message does not comprise the request for the particular service, then the communications processor is configured to route the data communications session to the remote server as originally requested; and otherwise, if the communications processor determines that the further message comprises the request for the particular service, then the communications processor is configured to proceed with the servicing of the data communications session via the local server function.

4. The terminal node according to claim 3, wherein if the communications processor determines that the further message comprises the request for the particular service, before proceeding with the servicing of the data communications session via the local server function, the communications processor is configured to:

determine whether the service is an interactive service; and if the communications processor determines that the service is not an interactive service, then the communications processor is configured to route the data communications session to the remote server as originally requested; and otherwise, if the communications processor determines that the service is an interactive service, then the communications processor is configured to proceed with the servicing of the data communications session via the local server function.

5. A method comprising:

receiving, by a terminal node, a message originating from a client terminal, wherein the terminal node serves as an entry point to, and services data communications connections over, a wide area network (WAN) for the client terminal;

determining that the message comprises an initiation request for establishing a data communications connection over the wide area network between the client terminal and a remote server;

determining that an intercept state is in effect, and, upon determining that the intercept state is in effect, determining that an intercept frequency parameter is satisfied;

establishing the data communications connection as a local connection between the client terminal and the terminal node; and servicing the data communications connection via a local server function, wherein the servicing of the data communications connection via the local server function comprises a provision of status-based messaging to the client terminal.

6. A communications terminal node comprising:

a receiver configured to receive a message originating from a client terminal, wherein the terminal node serves as an entry point to, and services data communications connections over, a wide area network (WAN) for the client terminal; and a communications processor configured to determine that the message comprises an initiation request for establishing a data communications connection over the wide area network between the client terminal and a remote server, and to determine that an intercept state is in effect, and, upon determining that the intercept state is in effect, determining that an intercept frequency parameter is satisfied; and wherein, upon determining that the message comprises the initiation request and that the intercept state is in effect, the communications processor is configured to establish the data communications connection as a local connection between the client terminal and the terminal node, and to service the data communications connection via a local server function, wherein the servicing of the data communications connection via the local server function comprises a provision of status-based messaging to the client terminal.

7. The method according to claim 5, further comprising: determining that a port associated with the requested data communications session is configured as a port subject to the intercept state.

8. The method according to claim 5, wherein the status based messaging comprises information regarding one or more of status of potential communications links between the client terminal and the WAN, status of the WAN, status of a subscription or other account associated with the client terminal, promotions or other services or items of interest relevant to a subscriber associated with the client terminal, and other issues relevant to the client terminal or to a subscriber associated with the client terminal.

9. The method according to claim 5, further comprising:
upon establishing the data communications session as a local session between the client terminal and the terminal node, establishing a protocol session for the data communications session;
receiving a further message from the client terminal via the protocol session requesting a service associated with the remote server; and
proceeding with the servicing of the data communications session via the local server function.

10. The method according to claim 9, further comprising:
upon receiving the further message from the client terminal via the protocol session requesting the service associated with the remote server, determining that the requested service is an interactive service; and
then proceeding with the servicing of the data communications session via the local server function.

11. The method according to claim 1, further comprising: determining that a port associated with the requested data communications session is configured as a port subject to the intercept state.

12. The method according to claim 1, wherein the status based messaging comprises information regarding one or more of status of potential communications links between the client terminal and the WAN, status of the WAN, status of a subscription or other account associated with the client terminal, promotions or other services or items of interest relevant to a subscriber associated with the client terminal, and other issues relevant to the client terminal or to a subscriber associated with the client terminal.

13. The communications terminal node according to claim 6, wherein the communications processor is configured to determine that a port associated with the requested data communications session is configured as a port subject to the intercept state.

14. The communications terminal node according to claim 6, wherein the status based messaging comprises information regarding one or more of status of potential communications links between the client terminal and the WAN, status of the WAN, status of a subscription or other account associated with the client terminal, promotions or other services or items of interest relevant to a subscriber associated with the client terminal, and other issues relevant to the client terminal or to a subscriber associated with the client terminal.

15. The communications terminal node according to claim 6, wherein, upon establishing the data communications session as a local session between the client terminal and the terminal node:
the communications processor is configured to establish a protocol session for the data communications session;
the receiver is configured to receive a further message from the client terminal via the protocol session requesting a service associated with the remote server; and
upon the receipt of the further message requesting the service associated with the remote server, the communications processor is configured to proceed with the servicing of the data communications session via the local server function.

16. The communications terminal node according to claim 15, wherein, upon receiving the further message from the client terminal via the protocol session requesting the service associated with the remote server, the communications processor is configured to determine that the requested service is an interactive service, and to then proceed with the servicing of the data communications session via the local server function.

17. The communications terminal node according to claim 3, wherein the communications processor is configured to determine that a port associated with the requested data communications session is configured as a port subject to the intercept state.

18. The communications terminal node according to claim 3, wherein the status based messaging comprises information regarding one or more of status of potential communications links between the client terminal and the WAN, status of the WAN, status of a subscription or other account associated with the client terminal, promotions or other services or items of interest relevant to a subscriber associated with the client terminal, and other issues relevant to the client terminal or to a subscriber associated with the client terminal.

* * * * *